United States Patent
Huettel et al.

(10) Patent No.: US 7,042,661 B2
(45) Date of Patent: May 9, 2006

(54) DEVICE FOR SHIFTING THE POSITION OF A SWIVELING HOLDER

(75) Inventors: Peter Huettel, Jena (DE); Hanna Tielebier, Quitzöbel (DE)

(73) Assignee: Carl Zeiss Jena, GmbH, Jena (DE)

( * ) Notice: Subject to any disclaimer, the term of this patent is extended or adjusted under 35 U.S.C. 154(b) by 0 days.

(21) Appl. No.: 10/506,262

(22) PCT Filed: Feb. 20, 2003

(86) PCT No.: PCT/EP03/01721

§ 371 (c)(1),
(2), (4) Date: Feb. 8, 2005

(87) PCT Pub. No.: WO03/075071

PCT Pub. Date: Sep. 12, 2003

(65) Prior Publication Data

US 2005/0141071 A1    Jun. 30, 2005

(30) Foreign Application Priority Data

Mar. 1, 2002  (DE)  .................. 102 09 283

(51) Int. Cl.
    *G02B 7/02* (2006.01)
(52) U.S. Cl. .................. 359/821; 359/811; 359/813
(58) Field of Classification Search ............. 359/821,
        359/819, 811, 812, 813, 814, 817, 822, 823,
        359/694
    See application file for complete search history.

(56) References Cited

U.S. PATENT DOCUMENTS

| 4,486,078 A | 12/1984 | Hashimoto et al. ......... 359/381 |
| 4,544,236 A | 10/1985 | Endo .......................... 359/814 |
| 5,867,310 A | 2/1999 | Hasegawa ................... 359/381 |

FOREIGN PATENT DOCUMENTS

| DE | 32 40 401 | 5/1983 |
| SU | 736 036 | 5/1980 |

*Primary Examiner*—Timothy Thompson
(74) *Attorney, Agent, or Firm*—Reed Smith LLP

(57) ABSTRACT

The invention is directed to a device for switching a swivelable holder between two positions, e.g., for switching microscope objectives. The actuating element and swivelable holder are connected by two stretchable connection elements which serve to transmit the rotational movement and to fix the swivelable holder in the switching positions.

7 Claims, 1 Drawing Sheet

DEVICE FOR SHIFTING THE POSITION OF A SWIVELING HOLDER

CROSS-REFERENCE TO RELATED APPLICATIONS

This application claims priority of International Application No. PCT//EP03/01721, filed Feb. 20, 2003 and German Application No. 102 09 283.4, filed Mar. 1, 2002, the complete disclosures of which are hereby incorporated by reference.

BACKGROUND OF THE INVENTION a) Field of the Invention

The invention is directed to a device for switching a swivelable holder between two positions. It is applicable wherever the movement of an actuating element is used to switch a swivelable holder between two defined positions.

b) Description of the Related Art

An application of this kind exists, for example, in the field of microscope construction where, e.g., interchangeable objectives, filters, shutters, prisms or mirrors are to be placed in the beam path selectively so as to be accurately positioned.

In this connection, it is usual to provide the swivelable holder and the actuating element with toothed wheels and to transmit the rotational movement of the actuating element to the swivelable holder. When the axes of the actuating element and swivelable holder intersect, combinations of spur gears and bevel gears are preferably used.

An example for the actuation of a swivelable holder by means of toothed wheels is shown in DE PS 32 40 401. Although toothed wheel drives of the kind mentioned above can be manufactured inexpensively, per se, the search for cost-saving solutions continues.

OBJECT AND SUMMARY OF THE INVENTION

Accordingly, it is the primary object of the invention to provide a device of the generic type which is simpler to produce than previously known solutions.

According to the invention, this object is met in a device for switching a swivelable holder between two positions having a rotatable actuating element. The swivelable holder has a stop for each position. Two stretchable connection elements are provided, each of which is articulated at the actuating element and at the swivelable holder at a distance from the axes of rotation of the holder. The articulation points are located essentially opposite one another with respect to the axes of rotation.

When the actuating element is rotated, one of the two connection elements is stretched and accordingly exerts a torque on the swivelable holder which moves the latter out of its initial position. After the dead center is overcome, it is pressed by the connection element against the stop associated with the second position and accordingly occupies a defined position. The actuating element can be rotated further against the tension of the first connection element until the catch is reached and the actuating element snaps in. The swivelable holder is now held in position by the connection element which is under tension. Changing back into the first position takes place in an analogous manner.

Now, instead of elaborate pairs of toothed wheels and bearing supports for them, only commercially available tension springs or cables of elastomeric material are required for transmitting movement.

The positioning accuracy is determined only by the two stops which can be adjustable. A high degree of accuracy for the catching of the driving axle is not required.

The invention can be applied when the axes of the actuating element and swivelable holder are in a parallel position and also when the axes intersect.

The invention will be described in the following for the preferred case with intersecting axes.

DESCRIPTION OF THE PREFERRED EMBODIMENTS

Figure 1:
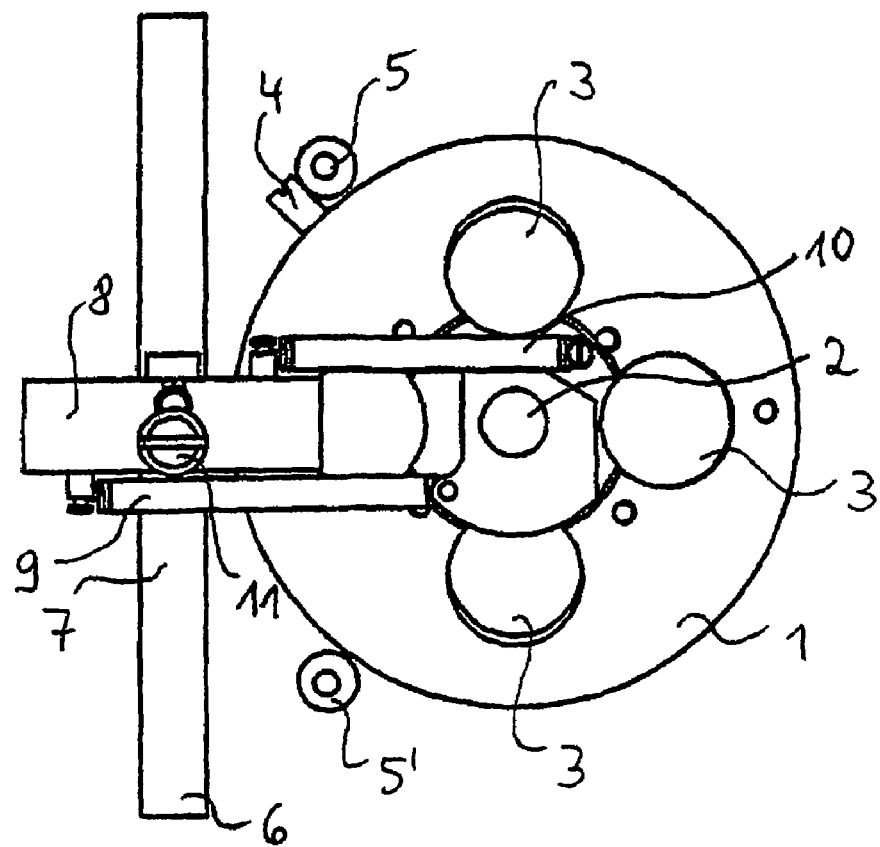
FIG. 1 shows a schematic top view of the preferred embodiment example.

FIG. 1 shows a swivelable holder constructed as a rotating plate 1 which is rotatable around an axle 2. The rotating plate 1 has openings 3 for receiving objectives, not shown, which are swiveled into the beam path in pairs, e.g., in a stereo microscope. The rotating movement of the rotating plate 1 is limited by the pin 4 which is attached to the rotating plate 1 and which acts against two stationary, but preferably adjustable, stops 5, 5'. The stops can be constructed as eccentric cams for purposes of adjustment.

The actuating element 6 comprises an axle 7 that can be provided with a gripping surface and a disk 8 that is fixedly connected to the axle 7. The connection between the actuating element 6 and the rotating plate 1 is produced by two tension springs 9, 10, preferably of the same length, which are so articulated at the disk 8 and rotating plate 1 at a distance from the respective axes of rotation that the axes of rotation extend approximately centric to the articulation points. The disk 8 can be fixed by means of a spring-loaded locking piece or catch 11 in a first groove 12.

Figure 2:
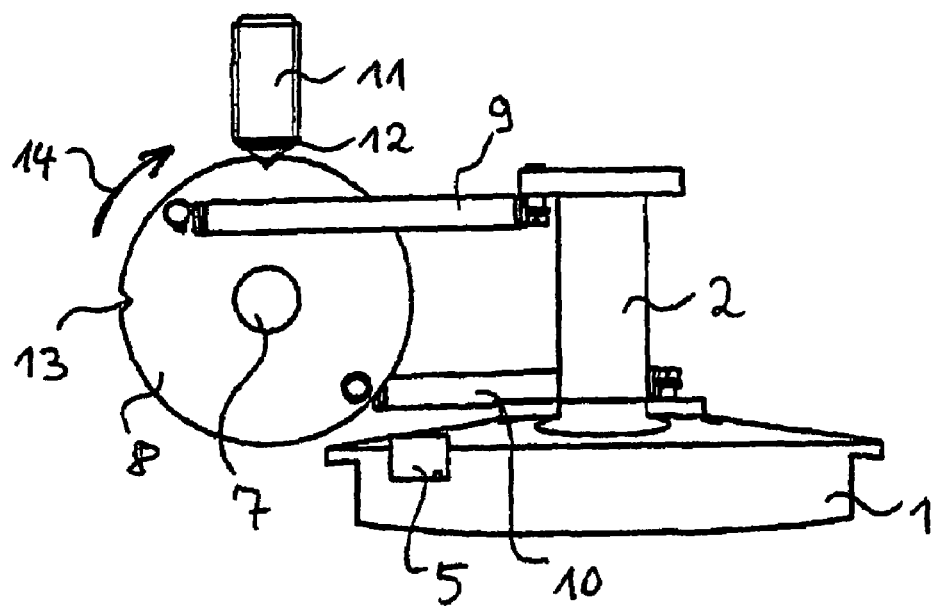
FIG. 2 shows a schematic side view of the preferred embodiment example.

In the side view (FIG. 2), the elements are provided with the same reference numbers as in FIG. 1. A second groove 13 is introduced into the disk 8 and the catch 11 locks in this second groove 13 in the second switching position.

In order to switch to the second switching position, the catch 11 is unlocked from the groove 12 by rotating the actuating element 6 in the direction of arrow 14. Due to the rotation of the disk 8 caused by this, spring 10 is stretched and spring 9 is relaxed. The stretched spring 10 accordingly exerts a torque on the rotating plate 1, which torque rotates the rotating plate 1 until the pin 4 strikes against the second stop 5'. The actuating element 6 is further rotated until the catch 11 locks in the groove 13, so that the spring 10 is tensioned and provides that the second position of the rotating plate fixed by the stop 5' is reliably retained.

Switching back into the first position of the rotating plate 1 is carried out by the actuating element 6 rotating opposite to the direction indicated by the arrow 14, so that spring 9 is rotated and spring 10 is relaxed. As a result of the torque exerted by the spring 9 on the rotating plate 1, the latter is rotated until the pin 4 strikes against the stop 5. By further rotation of the actuating element 6 until the catch 11 locks into the groove 12, the spring 9 is tensioned and secures the position of the rotating plate 1 in the first position. The two switching positions of the rotating plate 1 are therefore fixed exclusively by the stops 5, 5'. The position of the grooves 12, 13 for the catch 11 in combination with the spring constants of the springs 9, 10 only determines the retaining force of the rotating plate in the switching positions.

This results in a very simple construction which nevertheless achieves a reliable and accurate switching of the rotating plate. The realization of the invention is not limited to the embodiment example shown herein. For example, the springs can also be articulated at the axles of the rotating plate and actuating element by means of levers. The swivelable holder can also be constructed from swiveling arms instead of the disk and rotating plate shown in the embodiment example.

Similarly, the principle according to the invention can also be applied when the axles extend parallel to one another.

While the foregoing description and drawings represent the present invention, it will be obvious to those skilled in the art that various changes may be made therein without departing from the true spirit and scope of the present invention.

The invention claimed is:

1. A device for switching a swivelable holder between two positions comprising:
    a rotatable actuating element, said swivelable holder having a stop for each position; and
    two stretchable connection elements being provided, each of which being articulated at said actuating element and at the swivelable holder at a distance from axes of rotation of said holder, wherein the articulation points are located essentially opposite one another with respect to the axes of rotation.

2. The device for switching a swivelable holder according to claim 1, wherein the axes of rotation of the swivelable holder and of the actuating element are directed substantially parallel to one another.

3. The device for switching a swivelable holder according to claim 1, wherein the axes of rotation of the swivelable holder and of the actuating element extend substantially at an angle of 90° relative to one another.

4. The device for switching a swivelable holder according to claim 1, wherein the actuating element preferably has a catch.

5. The device for switching a swivelable holder according to claim 1, wherein the two stretchable connection elements extend substantially parallel to one another.

6. The device for switching a swivelable holder according to claim 1, wherein the stretchable connection elements are constructed as springs.

7. The device for switching a swivelable holder according to claim 1, wherein the stretchable connection elements are constructed as elastic cables.

* * * * *